Dec. 14, 1948.    J. W. CONKLIN    2,455,979
ELECTRO-SERVO SYSTEM
Filed Feb. 24, 1943
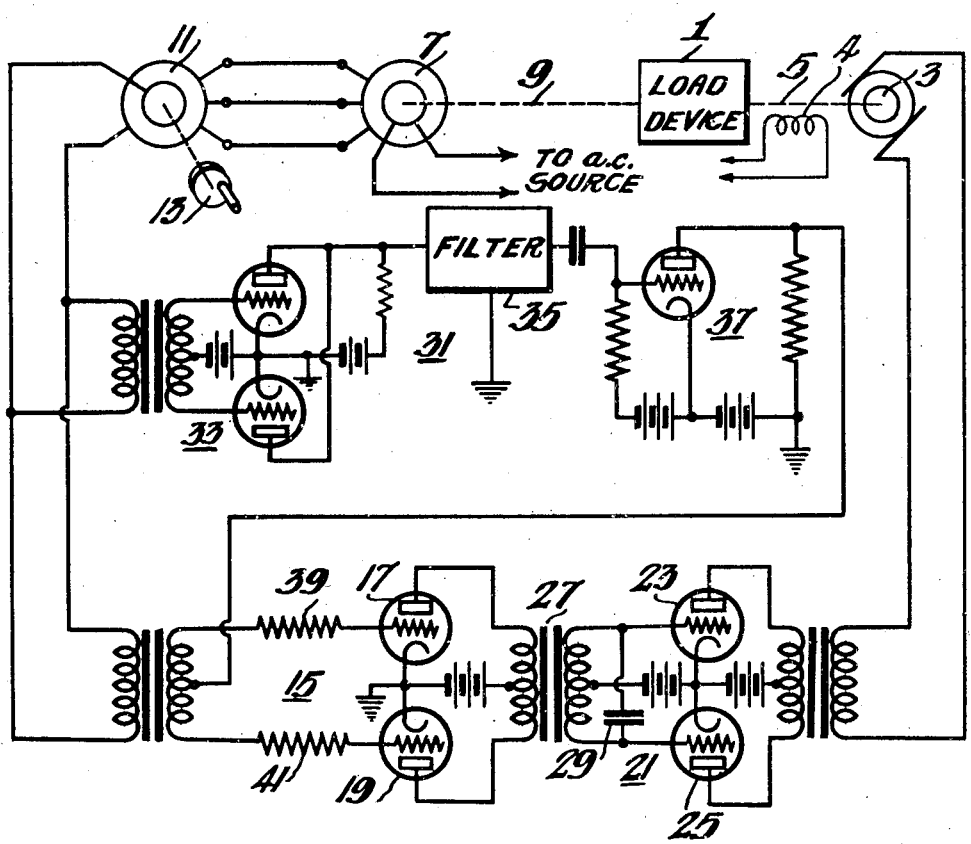
Inventor
James W. Conklin
By
C D Tuska
Attorney Patented Dec. 14, 1948

2,455,979

UNITED STATES PATENT OFFICE 2,455,979

ELECTRO-SERVO SYSTEM

James W. Conklin, Indianapolis, Ind., assignor to Radio Corporation of America, a corporation of Delaware Application February 24, 1943, Serial No. 476,901

7 Claims. (Cl. 318—30)

This invention relates to servo systems and more particularly to systems of the follow-up type for moving a driven device to a position corresponding to that of a control device. Such systems ordinarily operate by responding to the differences between the positions of the control device and driven device, and energizing a motor to move the driven device and reduce said difference to zero. It has been the practice in the past to attempt to provide control means which would cause the driven device to follow the controlling device with a minimum of lag. Owing to inertia, the driven device tends to continue to move after deenergization of the driving motor, over-running the position corresponding to that of the control member. This causes reversal of the motor control and oscillation about the point of positional agreement. Numerous more or less elaborate systems have been devised to combat this effect, which is known as "hunting," by applying braking or reverse power. Considerable deceleration forces and consequent mechanical stresses are likely to result in operation of systems of this type. In many applications, dynamic lag, provided it is not excessive, is of no particular importance.

Accordingly it is the principal object of the present invention to provide an improved method of and means for operating a servo system, so as to prevent "hunting."

Another object is to provide an improved method of and means for operating a servo system so as to cause the driven device to "coast" to rest at the equilibrium point.

It is a further object of this invention to provide improved means for operating a servo system whereby a dynamic lag is introduced and so proportioned with relation to rate of travel as to cause the driven device to just coast to rest at a desired null point.

A further object is to provide an improved method of and means for operating a servo system so as to avoid undue mechanical stresses in the driving motor, driven device, and the connections therebetween. These and other and incidental objects will become apparent to those skilled in the art upon consideration of the following description with reference to the accompanying drawing, which is a schematic diagram of a servo system embodying the instant invention.

The driven load device 1 is mechanically connected to an A.-C. motor 3, and to the rotor of a synchro transformer 7 as indicated by the dash lines 5 and 9. The motor 3 may be of the commutator type, provided with a separately excited field 4, or may be any other conventional type of reversible A.-C. motor. The transformer 7 comprises a single phase rotor and a polyphase stator of the "Selsyn" type. The rotor of the transformer 7 is connected to an A.-C. source, not shown. The stator of the transformer 7 is connected to the stator of a similar "Selsyn" device 11, hereinafter referred to as the control transformer. The rotor of the transformer 11 is mechanically connected to a control member such as a manually operable crank 13. The rotor of the control transformer 11 is electrically connected to an amplifier 15 comprising electron discharge tubes 17 and 19. The amplifier 15 is coupled to a power amplifier 21 comprising tubes 23 and 25. The output circuit of the amplifier 21 is coupled to the A.-C. motor 3. The coupling element between the amplifiers 15 and 21 comprises a selective filter element such as a transformer 27, tuned by a capacitor 29 connected across its secondary to resonance at the frequency of the A.-C. supply.

A control channel 31 is provided for the amplifier 15, comprising a detector 33, a filter 35, and a D.-C. amplifier 37. The detector 33 is coupled to the rotor of the control transformer 11, and the negative potential output of the control channel is connected to the grid return circuit of the amplifier 15. The detector 33 comprises a pair of electron discharge tubes with their grid circuits connected in push-pull and their anode circuits connected in parallel. Any conventional rectifier or detector circuit may be substituted for the circuit 33. The filter 35 is of the low-pass type, designed to reject rectified A.-C. components of the rectifier output, and to pass the relatively low frequency components corresponding to variations in the amplitude of the output of the control transformer 11. The amplifier 15 is designed to operate as a limiter, upon the saturation principle. Resistors 39 and 41 are connected in series with the control grids 17 and 19 to limit the flow of grid currents upon positive swings of grid voltage, clipping the peaks of the A.-C. input voltage at a level depending on the value of the negative D.-C. bias voltage provided by the amplifier 37.

The operation of the above described system is as follows:

The control device 13 is moved to a position corresponding to that to which it is desired to operate the load device 1. Assuming the position of the load device does not then correspond to the control device, energy from the A.-C. source is transmitted through the transformers 7 and 11 to the input circuits of the amplifier 15 and the detector 33. The amplitude of this voltage is proportional to the difference of position between the control member 13 and the device 11, and the polarity with respect to that of the A.-C. supply depends upon whether the driven device leads or lags the control device. The output of the detector 33 is proportional in magnitude to the magnitude of the output of the control transformer 11 and hence, during the operation of the control device 13, to the lag of the load device. The output of the transformer 11 is applied to the amplifier 15 and is limited thereby to a level depending on the output of the control channel 31. The flat top wave output of the amplifier 15 is filtered by the tuned transformer 27, providing sine wave output. This voltage is amplified by the power amplifier 21 to energize the motor 3. The amplitude of the input to the amplifier 15 increases with the angular lag, tending to increase the amplifier output and hence the energization of the motor 3. This effect occurs in the operation of the usual servo system, and is desirable in the practice of the present invention up to the point at which the motor is just sufficiently energized to maintain enough kinetic energy stored in the load to overcome friction in taking up the angular lag of the load, if the motion of the control device were suddenly stopped. At this point the control channel begins to limit the output of the amplifier 15. If the speed of operation of the control device is then increased, the output of the control channel 31 will increase correspondingly, causing a decrease in the gain of the amplifier 15, and a greater angle of lag of the load device.

Thus as the driven device approaches the position of angular agreement with the control device, the energy applied to the motor is decreased more rapidly than would be the case if the control channel 31 were not included. With proper adjustment of the gain of the D.-C. amplifier 37 in accordance with the dynamic friction of the load device, the motor may be caused to coast to a standstill at the point of exact positional equilibrium independently of the length or rate of operation of the control member.

The invention has been described as an improved servo system, wherein "hunting" is avoided by deenergizing the driving motor in response to the rate of approach of the driven device to positional agreement with the control means, rather than by application of braking or reverse energization. An auxiliary control channel is provided comprising a detector responsive to the difference in position of the control and driven device, and the output of said channel is employed to control the sensitivity of the main motor control channel.

I claim as my invention:

1. A servo system comprising a driving motor, a load device connected to said motor, a source of alternating current, an input shaft and control means for deriving from said source an A.-C. signal related in magnitude and polarity to the difference in angular position between said input shaft and said device, a limiting amplifier coupled to said control device and to said motor whereby said motor is energized in response to the output of said amplifier, and rotates in a direction to reduce said difference, means including a rectifier for developing a D.-C. bias voltage proportional to the rate of change of said difference, and means including said D.-C. bias for reducing the limiting level of said amplifier and hence the driving torque of said motor in proportion to the rate at which the positional error between said device and said control means is reduced.

2. A device of the character described in claim 1 in which said amplifier includes grid limiting resistors for limiting the output thereof.

3. A control system for driving by energy from an alternating current source a load device to an angular position corresponding to that of a control member, comprising a first synchro transformer, a second synchro transformer mechanically connected to said load device and electrically connected between said alternating current source and said first synchro transformer, a mechanical connection between said first synchro transformer and said control member, an amplifier having means including a series grid limiting resistor coupling the input thereof to said first synchro transformer, means for producing a negative D.-C. bias voltage proportional in amplitude to the rate of decrease of the voltage developed by said first synchro transformer, and means for applying said bias voltage to the input of said amplifier to reduce the output thereof as a function of said rate of decrease.

4. The invention as claimed in claim 3 wherein said amplifier includes a coupling circuit tuned to resonate at the frequency of said A.-C. source.

5. A servo system comprising a driving motor connected to a load device, a source of alternating current, an input shaft and control means for deriving from said source an A.-C. signal related in magnitude and polarity to the difference in angular position between said input shaft and said load device, an amplifier having means including a series grid limiting resistor coupling the input thereof to said first synchro transformer, said motor being driven by the output of said amplifier, the value of said resistor being selected to cause the energization of said motor to increase with an increase in the amplitude of said A.-C. signal up to the point at which the kinetic energy stored in the load and motor is just sufficient to cause said load to coast through an angle equal to said difference in angular position, and means for deenergizing said motor in response to the rate of approach of said load device to positional agreement with said control means.

6. A servo system comprising a driving motor connected to a driven load device, a source of alternating current, an input shaft and positionable control means connected thereto for deriving from said source an A.-C. signal related in magnitude and polarity to the difference between the position of said input shaft and the position of said load device, an amplifier for producing output currents for energizing said motor, means for applying said A.-C. signal to the input of said amplifier, a grid limiting resistor included in said amplifier for limiting the amplitude of said output currents to a predetermined maximum value, and means responsive to the rate of decrease of amplitude of said A.-C. signal for deenergizing said motor.

7. A device of the character described in claim 6 in which said last named means comprises means for producing a D.-C. voltage whose amplitudes is proportional to the amplitude of said A.-C. signal, means for deriving therefrom a D.-C. bias voltage proportional to the rate of change of amplitude thereof, and means for applying said bias voltage to said amplifier for reducing the amplitude of said output currents.

JAMES W. CONKLIN.

REFERENCES CITED

The following references are of record in the file of this patent:

UNITED STATES PATENTS

| Number | Name | Date |
| --- | --- | --- |
| 1,554,698 | Alexanderson | Sept. 22, 1925 |
| 2,040,014 | Moseley | May 5, 1936 |
| 2,054,945 | Nisbet | Sept. 22, 1936 |
| 2,068,490 | Hull | Jan. 19, 1939 |
| 2,192,022 | Wills | Feb. 27, 1940 |